United States Patent
Reddy (10) Patent No.: US 7,219,732 B2
(45) Date of Patent: May 22, 2007

(54) METHODS OF SEQUENTIALLY INJECTING DIFFERENT SEALANT COMPOSITIONS INTO A WELLBORE TO IMPROVE ZONAL ISOLATION

(75) Inventor: B. Raghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 323 days.

(21) Appl. No.: 11/001,838

(22) Filed: Dec. 2, 2004

(65) Prior Publication Data

US 2006/0144593 A1   Jul. 6, 2006

(51) Int. Cl.
*E21B 33/13* (2006.01)
*E21B 43/00* (2006.01)

(52) U.S. Cl. ............... 166/292; 166/387; 166/177.4

(58) Field of Classification Search ......... 166/185–295
See application file for complete search history.

(56) References Cited

U.S. PATENT DOCUMENTS

| | | | |
|---|---|---|---|
| 3,734,188 A | 5/1973 | Root et al. ............... | 166/292 |
| 4,340,427 A | 7/1982 | Sutton .................... | 106/87 |
| 4,472,200 A | 9/1984 | Crump et al. ............. | 106/90 |
| 4,515,635 A | 5/1985 | Rao et al. ................ | 106/90 |
| 4,537,918 A | 8/1985 | Parcevaux et al. ......... | 523/130 |
| 4,555,269 A | 11/1985 | Rao et al. ............... | 106/90 |
| 4,565,578 A | 1/1986 | Sutton et al. ............ | 106/87 |
| 4,676,832 A | 6/1987 | Childs et al. ............ | 106/90 |
| 4,818,288 A | 4/1989 | Aignesberger et al. ...... | 106/90 |
| 5,027,900 A | 7/1991 | Wilson ................... | 166/285 |
| 5,159,980 A | 11/1992 | Onan et al. .............. | 166/294 |
| 5,181,568 A | 1/1993 | McKown et al. ............ | 166/293 |
| 5,293,938 A | 3/1994 | Onan et al. .............. | 166/293 |
| 5,332,037 A | 7/1994 | Schmidt et al. ........... | 166/276 |
| 5,402,849 A | 4/1995 | Jennings, Jr. ............ | 166/291 |
| 5,588,488 A | 12/1996 | Vijn et al. .............. | 166/293 |
| 5,873,413 A | 2/1999 | Chatterji et al. ......... | 166/293 |
| 5,945,387 A | 8/1999 | Chatterji et al. ......... | 507/224 |

(Continued)

FOREIGN PATENT DOCUMENTS

CA   1 216 742   1/1984

(Continued)

OTHER PUBLICATIONS

Halliburton brochure entitled "CFR-3™ Cement Friction Reducer" dated 2004.

(Continued)

*Primary Examiner*—Frank Tsay
(74) *Attorney, Agent, or Firm*—Craig W. Roddy; Conley Rose, P.C.

(57) ABSTRACT

Methods of sealing a wellbore include sequentially displacing a first sealant composition and a second sealant composition different from the first sealant composition into the wellbore, followed by allowing the first and second sealant compositions to set. In an embodiment, the first and second sealant compositions are pulse injected into the wellbore. The first and second sealant compositions may be arranged in an alternating, stratified pattern in the wellbore. A mechanical property of the set first sealant composition and the same mechanical property of the set second sealant composition have substantially different values. As such, an impermeable, stratified structure comprising the set sealant compositions is formed that may resist failure when at least one of them is subjected to a mechanical stress.

35 Claims, 5 Drawing Sheets

U.S. PATENT DOCUMENTS

| | | | |
|---|---|---|---|
| 5,964,293 A | 10/1999 | Chatterji et al. | 166/294 |
| 6,156,808 A | 12/2000 | Chatterji et al. | 516/116 |
| 6,167,967 B1 | 1/2001 | Sweatman | 166/281 |
| 6,176,315 B1 | 1/2001 | Reddy et al. | 166/295 |
| 6,258,757 B1 | 7/2001 | Sweatman et al. | 207/219 |
| 6,271,181 B1 | 8/2001 | Chatterji et al. | 507/219 |
| 6,297,202 B1 | 10/2001 | Chatterji et al. | 507/261 |
| 6,315,042 B1 | 11/2001 | Griffith et al. | 166/291 |
| 6,508,305 B1 | 1/2003 | Brannon et al. | 166/293 |
| 6,516,885 B1 | 2/2003 | Munday | 166/295 |
| 6,524,384 B2 | 2/2003 | Griffith et al. | 106/705 |
| 6,607,035 B1 | 8/2003 | Reddy et al. | 166/295 |
| 6,645,288 B1 | 11/2003 | Dargaud et al. | 106/696 |
| 6,666,268 B2 | 12/2003 | Griffith et al. | 166/292 |
| 6,668,929 B2 | 12/2003 | Griffith et al. | 166/292 |
| 6,702,044 B2 | 3/2004 | Reddy et al. | 175/64 |
| 6,716,282 B2 | 4/2004 | Griffith et al. | 106/705 |
| 6,722,433 B2 | 4/2004 | Brothers et al. | 166/288 |
| 6,742,592 B1 | 6/2004 | Le Roy-Delage et al. | 166/293 |
| 2004/0112600 A1 | 6/2004 | Luke et al. | 166/295 |
| 2004/0144537 A1 | 7/2004 | Reddy et al. | 166/292 |
| 2004/0149431 A1 | 8/2004 | Wylie et al. | 166/242.1 |
| 2004/0171499 A1 | 9/2004 | Ravi et al. | 507/200 |
| 2004/0226717 A1 | 11/2004 | Reddy et al. | 166/295 |

OTHER PUBLICATIONS

Halliburton brochure entitled "D-AIR 3000 and D-AIR 3000L Defoamers" dated 1999.

Halliburton brochure entitled "Econolite Additive For Cement Slurries" dated 1998.

Halliburton brochure entitled "Halad®-344 Fluid-Loss Additive" dated 1998.

Halliburton brochure entitled "Silicalite Cement Additive" dated 1999.

Halliburton brochure entitled "Spherelite Cement Additive" dated 1999.

Patent Application entitled "Sealant Compositions Comprising Colloidally Stabilized Latex and Methods of Using The Same", by B. Raghava Reddy et al., filed Apr. 19, 2004 as U.S. Appl. No. 10/827,022.

Patent Appliction entitled "Emulsion Admixtures for Improving Cement Elasticity" by B. Raghava Reddy et al., filed Jan. 29, 2004 as U.S. Appl. No. 10/767,672.

Patent Application entitled "Settable Fluids Comprising Particle-Size Distribution-Adjusting Agents and Methods of Use" by B. Raghava Reddy et al., filed Jan. 16, 2004, as U.S. Appl. No. 10/759,678.

Patent Application entitled "Settable Fluids Comprising Particle-Size Distribution-Adjusting Agents and Methods of Use" by B. Raghava Reddy et al., filed Sep. 22, 2004, as U.S. Appl. No. 10/946,671.

METHODS OF SEQUENTIALLY INJECTING DIFFERENT SEALANT COMPOSITIONS INTO A WELLBORE TO IMPROVE ZONAL ISOLATION

FIELD OF THE INVENTION

The present invention generally relates to subterranean zonal isolation, and more particularly to methods of sealing a wellbore by sequentially injecting different sealant compositions into a wellbore that have different values for a given mechanical property.

BACKGROUND OF THE INVENTION

Zonal isolation refers to the isolation of a subterranean formation or zone, which serves as a source of a natural resource such as gas, oil, or water, from other subterranean zones. To achieve zonal isolation of a subterranean zone, a well bore is typically drilled down to the subterranean zone while circulating a drilling fluid through the wellbore. After the drilling is terminated, a string of pipe, e.g., casing, is run in the wellbore. Primary cementing is then usually performed whereby a sealant composition, e.g., a cement slurry, is pumped down through the string of pipe and into the annulus between the string of pipe and the walls of the wellbore to allow the cement slurry to set into an impermeable cement column and thereby seal the annulus. Subsequent secondary cementing operations may also be performed. One example of a secondary cementing operation is squeeze cementing whereby a cement slurry is forced under pressure to areas of lost integrity in the annulus to seal off those areas.

Unfortunately, long term zonal isolation is often compromised due to various circumstances. For example, during a transition phase in which a cement slurry changes from a true hydraulic fluid to a highly viscous mass showing some solid characteristics, it is desirable for the cement slurry to transmit hydrostatic pressure to prevent fluid (e.g., gas or water) from flowing from the subterranean zone into the slurry. However, the pressure exerted on the cement slurry by the fluid in the subterranean zone often exceeds the hydrostatic pressure of the cement slurry. When then happens, the fluid initially migrates into and through the cement slurry, forming flow channels therein that undesirably permit further migration of the fluid after the cement composition sets. As such, zonal isolation of the subterranean formation can be lost. Some conventional cement slurries have relatively long transition times that can exacerbate this problem.

Zonal isolation is also commonly compromised by cyclical changes in wellbore and formation pressures and temperatures during the life of the well. The piping in the wellbore to which the cement column is attached and the cement column itself may expand and contract due to the pressure and temperature changes. As such, the cement column is subjected to mechanical stress such as tensile, compressive, or shear stress. Moreover, the cement column may experience impacts and shocks generated by subsequent drilling and other well operations. Unfortunately, conventional cement suffers from the drawback of being brittle and fragile and thus often cannot sustain such stress. Thus, fractures through which fluids can undesirably flow may develop in the cement column. Further, a microannulus may form between the cement column and the piping or the subterranean zone.

Cement compositions such as foamed cement compositions and sealant compositions having improved elasticity have been developed that are more likely to provide for long term zonal isolation than traditional cement compositions. However, those more recently developed compositions suffer from the drawback of having complex designs that require several additives to achieve desired bulk properties. The cost of using the additives in the amounts required to seal a wellbore with a single composition containing such additives is typically very high. A need therefore exists to develop a less expensive method for improving zonal isolation and thus extending the life of the well.

SUMMARY OF THE INVENTION

Methods of sealing a wellbore include sequentially displacing a first sealant composition and a second sealant composition different from the first sealant composition into the wellbore, followed by allowing the first and second sealant compositions to set. A mechanical property of the set first sealant composition and the same mechanical property of the set second sealant composition (e.g., elastic modulus) have substantially different values such that the first and second sealant compositions resist failure when at least one of them is subjected to a mechanical stress. In an embodiment, the first and second sealant compositions are pulse injected, for example sequentially, into the wellbore.

Structures for sealing a wellbore include first and second sealant compositions adjacently arranged (e.g., stacked) in the wellbore, wherein a mechanical property of the first sealant composition and the same mechanical property of the second sealant composition have substantially different values such that the first and second sealant compositions are capable of resisting failure when at least one of them is subjected to a mechanical stress. The first and second sealant compositions may be arranged in an alternating pattern in the wellbore. In an embodiment, one sealant composition comprises a foamed cement composition and the other sealant composition comprises a non-foamed cement composition. In another embodiment, one sealant composition comprises a cement composition (e.g., foamed, non-foamed, or both) and the other sealant composition comprises a flexible sealant composition. In another embodiment, one sealant composition comprises a retarded cement composition that remains a fluid for an extended or optionally indefinite period of time. In another embodiment, one sealant composition may have a higher elastic modulus and the other sealant composition may have a lower elastic modulus when tested under compressive and/or tensile modes. In another embodiment, one sealant composition may have higher compressibility as reflected by a low Poisson's Ratio and the other sealant composition may have a lower compressibility as reflected by a high Poisson's Ratio. In another embodiment, the ratio of tensile strength of a first cement composition to a second cement composition is greater than one.

DETAILED DESCRIPTION OF THE PREFERRED EMBODIMENTS

A wellbore may be formed by first drilling the wellbore to a desired depth such that the wellbore penetrates a subterranean formation. It is understood that "subterranean formation" encompasses both areas below exposed earth or areas below earth covered by water such as sea or ocean water. A drilling fluid, also known as a drilling mud, may be circulated through the wellbore as it is being drilled. At least one conduit such as a casing may then be placed in the wellbore while leaving a space known as an annulus between the wall of the conduit and the wall of the wellbore. The drilling fluid may then be displaced down through the conduit and up through the annulus one or more times, for example, twice, to clean out the hole. A spacer fluid may then be optionally conveyed downhole and up through the annulus, thereby displacing the drilling fluid from the wellbore.

Subsequently, at least two different sealant compositions may be sequentially displaced down through the conduit in the wellbore and up through the annulus. The displacement of the sealant compositions may be performed via any known means such as by pumping, injecting, etc. In an embodiment, the sealant compositions are sequentially displaced into the wellbore using pulse injection. While various pulse injected embodiments are described herein, it should be understood that other suitable displacement or pumping means may be employed. As used herein, "pulse injection" refers to the sequential displacement of sealant composition layers in the wellbore, and a "pulse" is synonymous with a sealant composition layer. The pulse injection of the different sealant compositions may be repeated for a period of time effective to fill the annulus. After placing the different sealant compositions in the annulus, those compositions are allowed to set, thereby forming a stratified, impermeable structure for sealing the wellbore and supporting the conduit in the wellbore. At least one mechanical property of the different sealant compositions (e.g., strata) in the stratified, impermeable structure has substantially different values.

Figure 1:
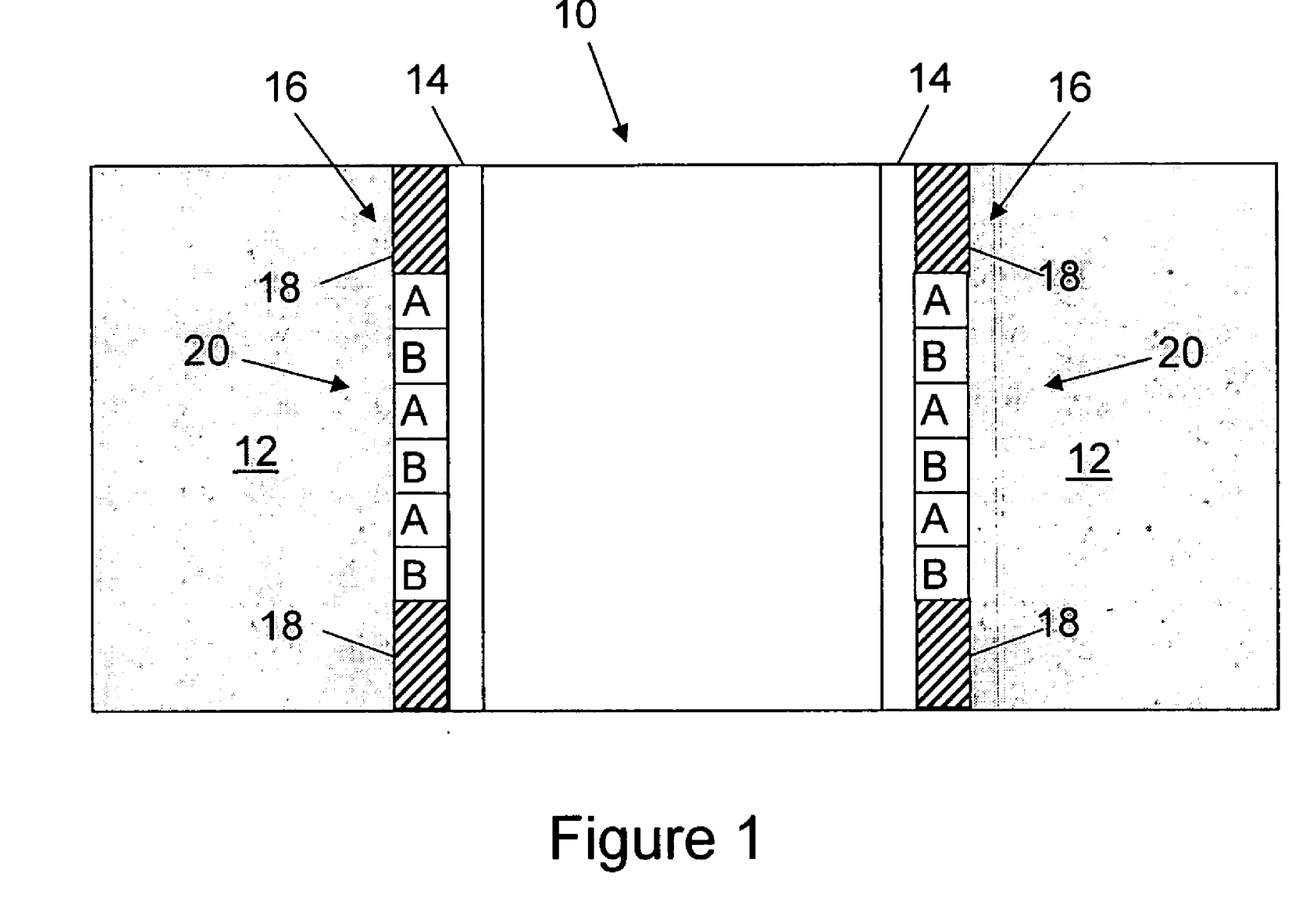
FIG. 1 depicts a cross-sectional view of a cement column formed in the annulus of a wellbore, wherein the cement column includes alternating layers of different sealant compositions in accordance with an embodiment.

For example as shown in FIG. 1, pulse injections may be alternated between a first sealant composition A and a second sealant composition B until the annulus is filled. FIG. 1 depicts a wellbore 10 that penetrates a subterranean formation 12. A conduit 14 such as a casing is disposed in wellbore 10 for conveying material into and out of wellbore 10. The sealant compositions thus pass down conduit 14 and up into an annulus 16 interposed between conduit 14 and subterranean formation 12. The sealant compositions are allowed to set in annulus 16, thereby forming a column 20 having alternating layers of sealant composition A and sealant composition B, for example a column of alternating cement layers. In various embodiments, including but not limited to those shown in FIGS. 1 and 2, the thicknesses of the layers in column 20 may be about equivalent or alternatively may be unequal. The average volume of a layer, e.g., sealant composition A, is equal to total volume of sealant composition A displaced into the wellbore divided by the number of pulses or layers. Optionally, as illustrated in FIG. 1, a filler cement 18 may be placed in annulus 16 above and/or below a primary zonal isolation area sealed by compositions A and B. Filler cement 18 may include, for example, a conventional cement or various combinations of the sealant compositions described herein.

Figure 2:
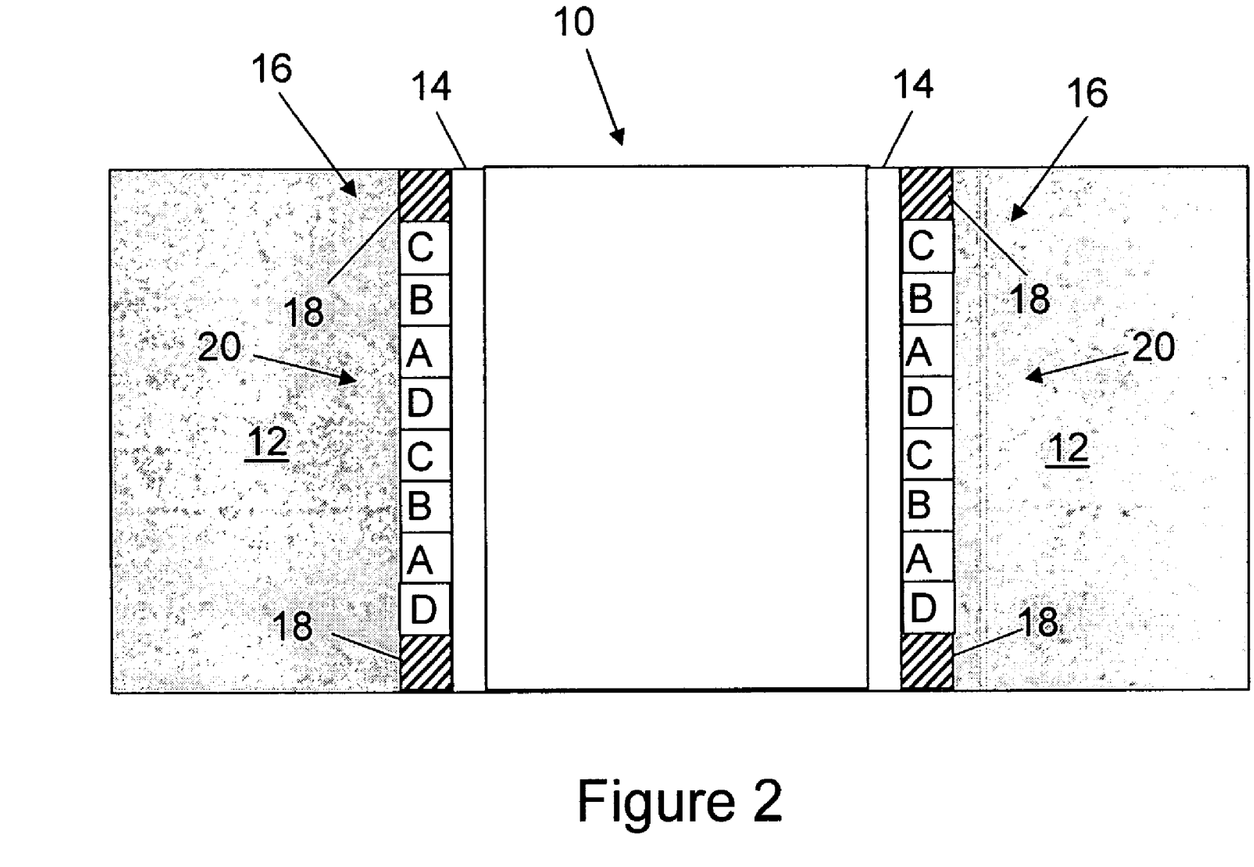
FIG. 2 depicts a cross-sectional view of a cement column formed in the annulus of a wellbore, wherein the cement column includes layers of a plurality of different sealant compositions arranged in a regular pattern.

Alternatively as shown in FIG. 2, pulse injections may be cycled through a plurality of sealant compositions, e.g., sealant compositions C, B, A, and D, as many times required to fill the annulus. FIG. 2 is the same as FIG. 1, except that column 20 includes a regular pattern of a plurality of sealant compositions arranged in layers of about equivalent thicknesses, alternatively in layers of unequal thickness. In particular, a vertical arrangement of sealant compositions C, B, A, and D is repeated twice. It is understood that this arrangement may be repeated as many times as desired. Alternatively, an irregular pattern of a plurality of sealant compositions could be arranged in layers of about equivalent thicknesses in column 20 (not shown), alternatively in layers of unequal thickness.

Figure 3:
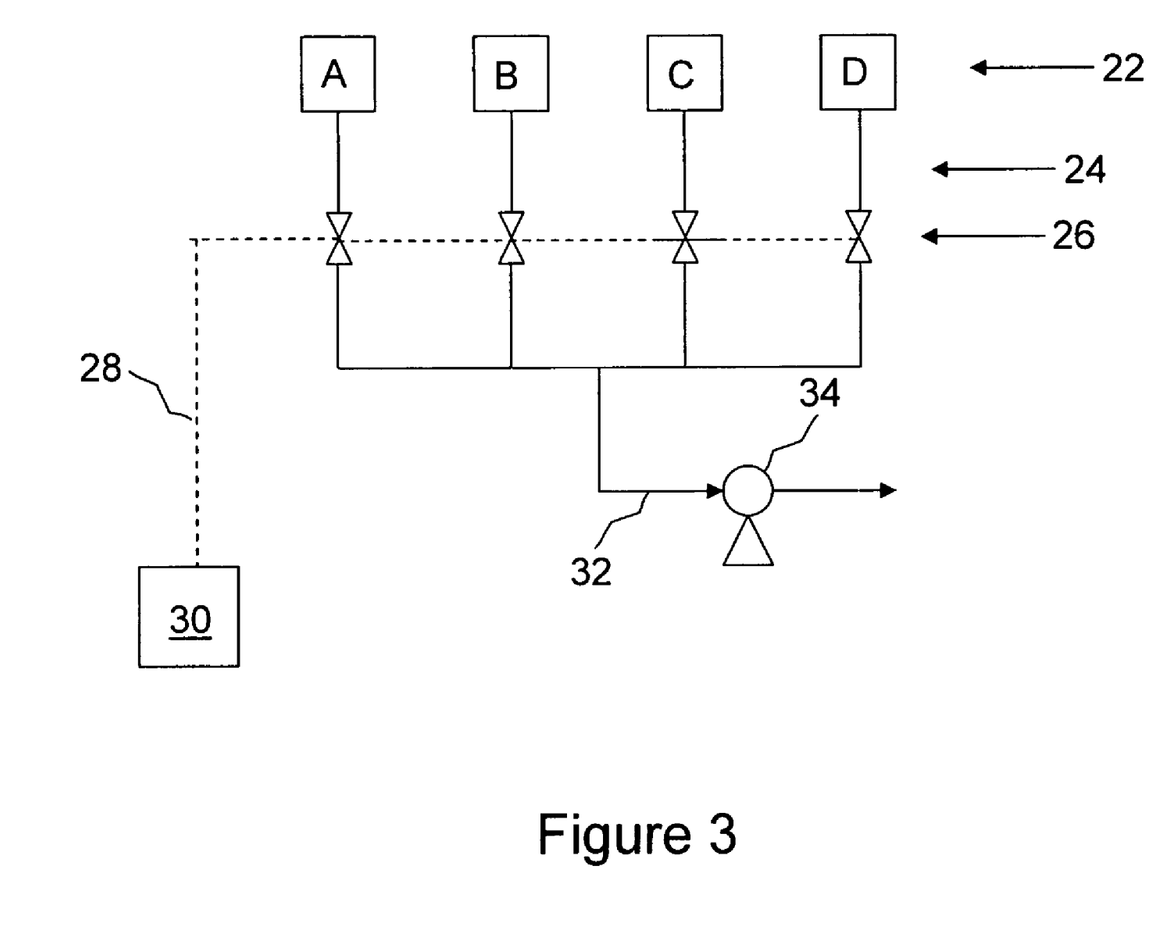
FIGS. 3–5 depict different embodiments of a process flow diagram for sequentially displacing different sealant compositions into a wellbore.
Figure 4:
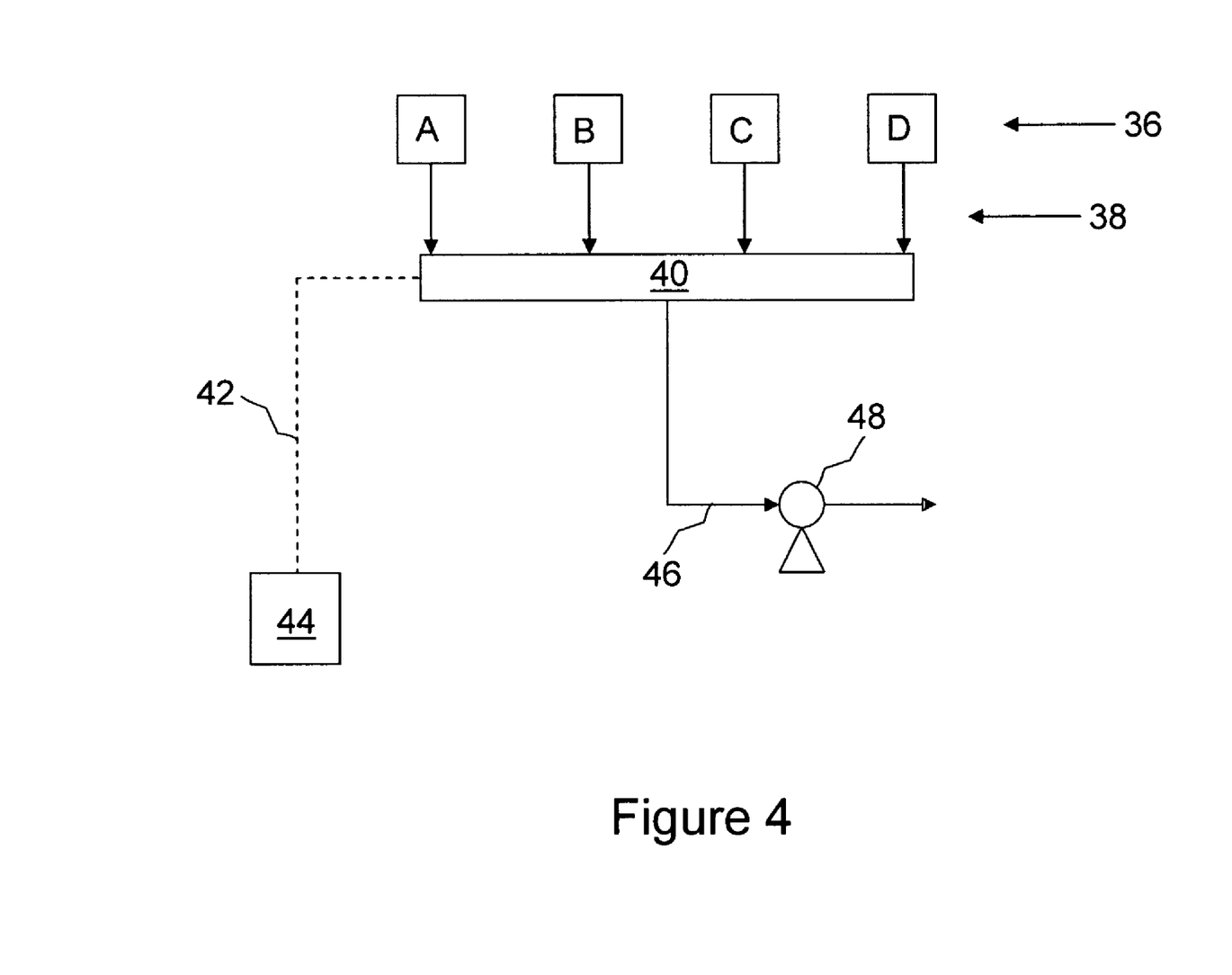

The various sealant compositions may originate from different sources, or they may originate from a single source. In one embodiment shown in FIG. 3, different types of sealant compositions may be pumped downhole via pump 34 from separate containers or tanks 22. Such containers 22 may, for example, include mixing devices for blending the sealant compositions before pumping them into the wellbore. The sealant compositions may be pumped from their respective containers 22 through separate conduits 24 that merge into a single conduit 32 connected to pump 34. The various conduits 24 exiting the different containers 22 may include valves 26 for regulating the amount of each fluid delivered to pump 34. A control system 30 may be coupled to valves 26 via an electrical line 28 for controlling the flow through the valves 26. Alternatively in FIG. 4, the sealant compositions may flow from their respective containers 36 via various conduits 38 to a mixing or blending header 40, where one or more sealant compositions may be selected or combined (e.g., blended) and fed to a pump 48 via a conduit 46. The selection or combination of the sealant compositions in header 40 may be controlled by a control system 44 that is coupled to header 40 via electrical line 42.

Figure 5:
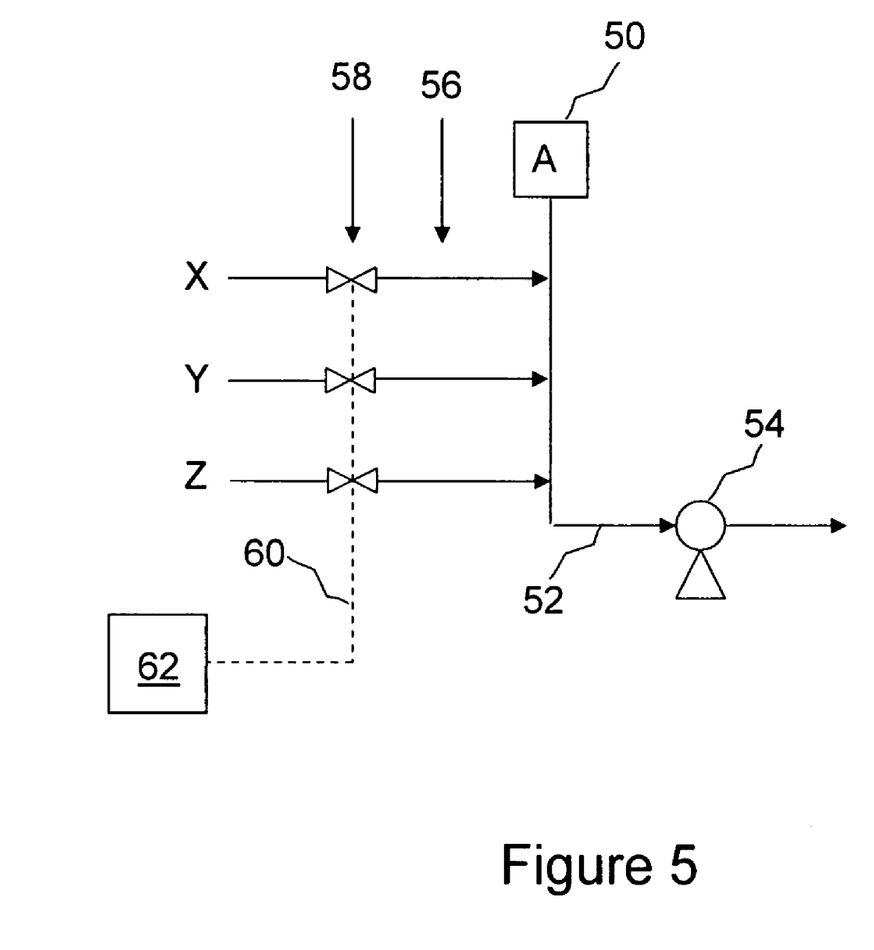

In another embodiment shown in FIG. 5, the sealant compositions may be displaced from a single source 50, e.g., a master batch sealant composition A, through conduit 52 to the wellbore using a pump 54. As this sealant composition is being pumped into the wellbore, different sealant compositions are formed by introducing one or more additives, e.g., X, Y, Z, or combinations thereof, to a portion of the original sealant composition. The additives may flow through conduits 56, which merge with conduit 52. The flow of the additives through conduits 56 may be regulated by the control of valves 58, which are disposed in conduits 56. A control system 62 may be coupled to valves 58 via electrical line 60 for controlling the amount of each additive being combined with the original sealant composition. An exemplary additive may be a gas or a gas generating material that is pulse injected into a cement slurry to form alternating foamed and non-foamed layers in the cement slurry. Another exemplary additive may be a light weight additive such as hollow beads, for example cenospheres or glass, thermosplatic or elastomeric beads; elastomers such as styrene-butadiene copolymers; water; aqueous solutions of silicate salts; minerals such as pozzalanic ash materials; slag; expansion additives; clays; fibers; and the like; and combinations thereof. The additives may be added in the form of solids, suspensions, solutions, emulsions and the like. Commercial examples of light weight additives include but not limited to cenospheres available as SPERELITE from Halliburton Energy Services; glass beads available as SCOTCHLITE from 3M corporation, St. Paul, Minn.; elastomeric beads available as EXPANCEL beads from Expancel, Inc., Duluth, Ga.; expandable thermoplastic beads available as Expandable Polystyrene Beads from Huntsman Corp, Austin, Tex.; elastomer based styrene-butadiene radial, block copolymer available as FDP C665 from Halliburton Energy Services; and glass fiber available as FDP C735 from Halliburton Energy Services.

The sealant compositions may be placed at different depths in the wellbore based on their respective density values. Before injecting the sealant compositions into the wellbore, the fracture gradient of the subterranean zone and the pressures exerted by the fluid therein at different depths may be determined using techniques known to those skilled in the art. The hydrostatic pressure of a fluid is based upon the height of the column of fluid and the density of the fluid. Thus, the different sealant compositions may be pumped to different heights or levels in the wellbore at which their respective density values after placement are appropriate to ensure that the hydrostatic pressures they exert are sufficient to balance the pressure exerted by the fluid in adjacent portions of the subterranean zone. As a result, the fluid is inhibited from flowing out of the subterranean zone and undesirably forming flow channels in the sealant compositions as they set. Otherwise, such flow channels could comprise the zonal isolation achieved by the resulting stratified, impermeable structure formed in the annulus. Further, the density values of the sealant compositions at their respective positions in the wellbore typically are not sufficient to fracture the subterranean zone. By way of example, the pressure exerted by a fluid in a subterranean zone typically increases as its depth within the subterranean zone increases. Thus, a less dense sealant composition may be placed near the surface of the wellbore, whereas a denser sealant composition may be placed at a lower depth in the wellbore.

The order by which the different sealant compositions are injected into the wellbore may be selected to achieve a desired pattern of mechanical properties within the stratified, impermeable structure comprising the set sealant compositions, e.g., column 20 in FIGS. 1 and 2. In an embodiment, two sealant compositions having different values for a particular mechanical property may be arranged in an alternating pattern in the wellbore as described previously. In another embodiment, a plurality of sealant compositions having different values for the same mechanical property may be adjacently arranged in series in the wellbore, and this series may be repeated or alternated with another series of sealant compositions as described previously. By way of example, the sealant compositions may be arranged such that a gradient of their different values for a particular mechanical property is present in the impermeable structure. Examples of mechanical properties for which the sealant compositions may have differing values include the elastic modulus (also known as Young's modulus), compressibility, tensile strength, impact strength, or combinations thereof. Compositions may be used in relative effective amounts to achieve a desired physical property profile along the length of the stratified, impermeable structure.

In another embodiment, one sealant composition may have a higher elastic modulus and the other sealant composition may have a lower elastic modulus when tested under compressive and/or tensile modes. For example, the elastic modulus in tension or compression of one sealant composition may be from about 0.5 to about 1000 times that of the other sealant composition. In another embodiment, one sealant composition may have higher compressibility as reflected by a low Poisson's Ratio and the other sealant composition may have a lower compressibility as reflected by a high Poisson's Ratio. For example, the Poisson's Ratio, which is a measure of the compressibility of a sealant composition, for one sealant composition may differ from the other sealant composition by at least 0.02 units. Poisson's Ratio is defined as the ratio of the transverse contraction per unit dimension of a bar of uniform cross-section to its elongation per unit length, when subjected to a tensile stress. Under compressive stress, Poisson's Ratio may be defined as the ratio of transverse expansion per unit dimension of a bar of uniform cross-section to its compression per unit length. In some embodiments, the tensile strength of one sealant composition may be at least about 20% greater than that of the other sealant composition. In some embodiments, the compressive strength of one sealant composition is at least about 20% greater than that of the other sealant composition. For example, the ratio of tensile strength of a first cement composition to a second cement composition may be greater than one.

A specific example of an arrangement of different sealant compositions in an impermeable structure include a foamed cement composition having a relatively high compressibility and a relatively low elastic modulus alternated with a non-foamed cement composition having a relatively low compressibility and a relatively high elastic modulus, or vice versa. Foamed cement compositions and non-foamed cement compositions are known in the art. Cement compositions typically comprise hydraulic cement and a sufficient amount of fluid to render the compositions pumpable. Hydraulic cement includes various species that set and harden by reaction with water, such as calcium, aluminum, silicon, oxygen, sulfur, or combinations thereof. Examples of hydraulic cements include Portland cements, pozzolanic cements, gypsum cements, high alumina content cements, silica cements, high alkalinity cements, and combinations thereof. Examples of fluids that may be combined with the cement include fresh water or salt water, e.g., an unsaturated aqueous salt solution or a saturated aqueous salt solution such as brine or seawater. Foamed cement compositions typically include a gas such as nitrogen and surfactants in addition to the same components present in cement compositions.

Another specific example of an arrangement of different sealant compositions in an impermeable structure include a first sealant composition having a relatively high compressive strength and high elastic modulus alternated with a second sealant composition having a relatively low compressive strength and low elastic modulus. Preferably, the first and second sealant compositions have about the same density. An example of the first sealant composition having high compressive strength and high elastic modulus is a cement slurry containing low density, hollow glass beads available as SCOTCHLITE from 3M Corporation, St. Paul, Minn. or cenospheres available as SPHERELITE from Halliburton Energy Services in amounts of from about 10 to about 60% by weight of cement. An example of the second sealant composition having low compressive strength and low elastic modulus is a cement slurry containing styrene-butadiene block copolymer available as FDP 665 from Halliburton Energy Services in amounts of from about 5 to about 35% by weight of cement. The ratio of the first and second sealant compositions in the stacked layers may range from about 5:95 to about 95:5.

Another example of sealant composition arrangement is a conventional cement composition alternated with a flexible sealant composition, or vice versa. Examples of conventional cement compositions include the foamed and non-foamed cement compositions described above, and combinations thereof. Flexible sealant compositions may comprise, for example, latexes, liquid rubbers, silicone oils, or combinations thereof. In an embodiment, the flexible sealant composition has lower elastic modulus, higher tensile strength, lower compressive strength, and higher impact strength than those of the cement composition. Additionally such flexible sealants may contain a gas which may provide for contrasting compressibility of the flexible sealant. Examples of suitable flexible sealant compositions are described in U.S. Pat. Nos. 5,159,980; 5,293,938; 5,588,488; and 6,722,433, each of which is incorporated by reference herein in its entirety. Examples of suitable latex-based sealant compositions include the colloidally stabilized latex compositions described in copending U.S. patent application Ser. No. 10/827,022 filed Apr. 19, 2004 and Ser. No. 10/767,672 filed Jan. 29, 2004, each of which is incorporated by reference herein in its entirety.

Another example of sealant composition arrangement is a cement composition comprising a retarder alternated with a conventional cement composition on flexible sealant composition described above. In an embodiment, the retarded cement remains a fluid for an extended or optionally indefinite period of time. The retarders which keep a cement composition in a fluid state for an extended period include, but not limited to amino alkylidene phosphonic acids such as those available under the trade name DEQUEST from Solutia corporation, St. Louis, Mo.; sucroses; alpha-hydroxycarboxylic acids such as tartaric acid, gluconic acid and citric acid; borate salts such as sodium or potassium pentaborate or borax salt; and the like. Cement compositions retarded with DEQUEST materials are discussed in U.S. Pat. Nos. 4,676,832, 4,472,200, CA 1,216,742 and a copending U.S. patent application Ser. No. 10/759,658, filed Jan. 16, 2004, each of which is incorporated by reference herein in its entirety. The amount of retarders which may be need to keep the cement slurry in a fluid state for an extended period may be in the range of 5 to 30% by weight of cement.

Selectively arranging the mechanical properties in a stratified, impermeable structure in the manner described above can make the structure, and hence the sealant compositions therein, resistant to failure. As used herein, failure refers to the inability to achieve zonal isolation of an adjacent subterranean zone. Thus, the integrity of the impermeable structure is less likely to be compromised when it is subjected to mechanical stresses (e.g., tensile stress, compressive stress, or shear stress) caused by, e.g., cyclical temperature and pressure changes and impacts in the wellbore. By way of example, the conduit in the wellbore to which the impermeable structure is attached may expand and contract due to the pressure and temperature changes, thus subjecting the structure to mechanical stress. The more flexible and compressible sealant compositions in the impermeable structure can absorb such stress and protect the other sealant compositions from failing. However, if the other sealant compositions happen to experience failure due to, e.g., internal fractures or the formation of a microannulus between the impermeable structure and the conduit, that failure is limited to only portions of the structure (e.g., a given strata or layer) and does not extend through the entire length of the structure.

EXAMPLES

Comparative Example 1

A cement slurry weighing 12 pounds per gallon was prepared according to API procedure specified in "Recommended Practice for Testing Well Cements", API Recommended Practice 10B, Twenty-Second Edition, December 1997. The slurry was prepared by mixing a blend of Class A cement, 20.7% by weight of cement (bwoc) of SCOTCHLITE beads having a specific gravity of 0.6 obtained from 3M Corporation of St. Paul, Minn.; 5% bwoc of SILICALITE available from Halliburton Energy Services; 0.7% bwoc of a fluid loss agent known as HALAD-344 available from Halliburton Energy Services; 0.2% bwoc of a cement dispersant known as CFR-3 available from Halliburton Energy Services; and 62.03% bwoc of water containing a defoamer known as D-AIR 3000L available from Halliburton Energy Services. The slurry was poured into greased 2"×5" metal cylinders fitted with a detachable bottom plate. The cylinders were cured at a temperature of 190° F. for 72 hrs under a pressure of 3000 psi. The cured samples were subjected to load vs displacement measurement on an MTS load frame equipment supplied by MTS Systems Corporation, Eden Prairie, Minn. and compressive strengths were measured according to ASTM D 3148-02.

Cyclic compression tests were performed to determine the resistance of the cements to the repeated axial stress cycling between high and low stress loads. It is anticipated that the cements which show an ability to sustain cyclic stresses as demonstrated in these experiments will also be able to sustain cyclic stresses encountered during service life in a wellbore even though the type of cyclic stresses in a wellbore are of different type (e.g., radial stresses). The cyclic tests were designed to provide data about the cement response to initial load cycles with one cycle comprising a high stress load starting at 50% of cement compressive strengths. The high stress load was increased 10% of the compressive strength per cycle to the final high stress load, which was set at the lower value of two standard deviations below the compressive strength, or 90% of the compressive strength. The low stress load was set at the larger value of 100 psi or 10% of compressive strength for all cycles. The remaining cyclic loading and unloading of stress was performed at the final stress value until failure. The initial partial load cycles were performed under displacement control at a displacement rate of $5 \times 10^{-5}$ inches per second, to match the displacement rate of stress-strain tests. The cyclic portion of the tests were run under force control with the first 10 cycles at 4 minutes per cycle, the next 50 cycles at 2 minutes per cycle, the next 190 cycle at 1 minute per cycle, and the final cycles at 30 sec per cycle. The number of cycles survived for several sample cylinders for the formulation was determined. The number of cycles survived by a formulation is considered a measure of its ability to sustain cyclic stress loads experienced in a well bore. The results for Comparative Example are shown in Table 1.

Example 1

Two cement formulations of identical density (12 ppg), one of which is as described in Comparative Example 1 were prepared. The second slurry was prepared from Class A cement; 30% bwoc of an elastomer known as FDP-665 available from Halliburton Energy Services; 2% bwoc of solid sodium silicate known as ECONOLITE available from Halliburton Energy Services; 2.0 grams of a defoamer known as D-AIR 3000L available from Halliburton Energy Services; and 95.12% bwoc of water.

The bottom ⅓ the volume of 2"×5" metal cylinders described above were filled with the slurry prepared in Comparative Example 1, the middle ⅓ volume with the slurry described in Example 1, and top ⅓ of the volume again with the slurry described in Comparative Example 1.

The cylinders were cured and analyzed for mechanical properties as described in Comparative Example 1. The results are shown in Table 1.

TABLE 1

|  | Compressive Strength, psi | Avg. number of cycles survived | Earliest Failure Cycles survived by a sample | Latest failure cycles survived by a sample |
| --- | --- | --- | --- | --- |
| Comparative Example 1 | 5970 | 35 | 2 | 89 |
| Example 1 | 620 | 210 | 4 | 381 |

The results clearly show that by alternating a brittle formulation with a composition comprising high levels of an elastomer, the resulting composition will survive cyclic stresses more effectively While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of sealing a wellbore in contact with a subterranean zone, comprising sequentially displacing alternating layers of two or more different sealant compositions into an annulus between a wall of the wellbore and a conduit in the wellbore, wherein the sealant compositions are displaced from different containers.

2. The method of claim 1, wherein three or more different sealant compositions are displaced into the wellbore.

3. The method of claim 1, wherein four or more different sealant compositions are displaced in into the wellbore.

4. The structure of claim 1, wherein the sealant composition layers are arranged in a repeating pattern in the wellbore.

5. The structure of claim 1, wherein the sealant composition layers are arranged in a non-repeating pattern in the wellbore.

6. The method of claim 1, wherein a mechanical property of one of the sealant compositions and the same mechanical property of another sealant composition have substantially different values.

7. The method of claim 6, wherein the sealant compositions having substantially different values are adjacent one another.

8. The method of claim 1, wherein one of the sealant compositions comprises a retarded cement.

9. The method of claim 1, wherein the sealant compositions are displaced via pulse injecting.

10. The method of claim 9, wherein said pulse injecting comprises pumping the sealant compositions from a single source and pulse injecting an additive therein.

11. The method of claim 10, wherein the additive comprises a gas or a gas generating material.

12. A method of sealing a wellbore in contact with a subterranean zone, comprising sequentially displacing alternating layers of two or more different sealant compositions into an annulus between a wall of the wellbore and a conduit in the wellbore, wherein a mechanical property of one of the sealant compositions and the same mechanical property of another sealant composition have substantially different values and wherein the sealant compositions are capable of resisting failure when subjected to a mechanical stress.

13. The method of claim 12, wherein the mechanical stress is caused by an expansion or contraction of the conduit.

14. A method of sealing a wellbore in contact with a subterranean zone, comprising sequentially displacing alternating layers of two or more different sealant compositions into an annulus between a wall of the wellbore and a conduit in the wellbore, wherein a mechanical property of one of the sealant compositions and the same mechanical property of another sealant composition have substantially different values and wherein the mechanical property comprises elastic modulus, compressibility, tensile strength, impact strength, or combinations thereof.

15. A method of sealing a wellbore in contact with a subterranean zone, comprising sequentially displacing alternating layers of two or more different sealant compositions into an annulus between a wall of the wellbore and a conduit in the wellbore, wherein one of the sealant compositions comprises a foamed cement composition and another of the sealant compositions comprises a non-foamed cement composition.

16. A method of sealing a wellbore in contact with a subterranean zone, comprising sequentially displacing alternating layers of two or more different sealant compositions into an annulus between a wall of the wellbore and a conduit in the wellbore, wherein one of the sealant compositions comprises cement and an additive selected from the group consisting of hollow beads, cenospheres, glass beads, thermosplatic beads, elastomeric beads, elastomers, styrene-butadiene copolymers, aqueous solutions of silicate salts, minerals, pozzalanic ash materials, slag, expansion additives, clays, fibers, or combinations thereof.

17. A method of sealing a wellbore in contact with a subterranean zone, comprising sequentially displacing alternating layers of two or more different sealant compositions into an annulus between a wall of the wellbore and a conduit in the wellbore, wherein one of the sealant compositions comprises a cement composition and another of the sealant compositions comprises a flexible sealant composition.

18. The method of claim 17, wherein the cement composition is foamed, non-foamed, or both.

19. The method of claim 17, wherein the flexible sealant composition comprises latex, liquid rubber, silicone oil, or combinations thereof.

20. The method of claim 17, wherein the flexible sealant composition comprises a colloidally stabilized latex.

21. A method of sealing a wellbore in contact with a subterranean zone, comprising sequentially displacing alternating layers of two or more different sealant compositions into an annulus between a wall of the wellbore and a conduit in the wellbore, wherein a mechanical property of one of the sealant compositions and the same mechanical property of another sealant composition have substantially different values and wherein a first sealant composition is allowed to set at a first depth in the wellbore, the first sealant composition having a first hydrostatic pressure at the first depth which is effective to inhibit fluid from flowing out of an adjacent first portion of the subterranean zone.

22. The method of claim 21, wherein a second sealant composition is allowed to set at a lower depth in the wellbore than the first depth, the second sealant composition having a second hydrostatic pressure at the lower depth which is effective to inhibit the fluid from flowing out of an adjacent second portion of the subterranean zone.

23. A structure for sealing a wellbore, comprising alternating layers of sealant compositions displaced into an annulus between a wall of the wellbore and a conduit in the wellbore, wherein a mechanical property of one of the sealant composition and the same mechanical property of another sealant composition have substantially different values, wherein the mechanical property comprises elastic modulus, compressibility, tensile strength, impact strength, or combinations thereof.

24. The structure of claim 23, wherein the sealant compositions are arranged in a repeating pattern in the wellbore.

25. The structure of claim 23, wherein the sealant compositions are arranged in a non-repeating pattern in the wellbore.

26. The structure of claim 23, wherein the sealant compositions are arranged such that a gradient of the different values are present in the structure.

27. The structure of claim 23, wherein one of the sealant compositions comprises a retarded cement.

28. A structure for sealing a wellbore, comprising alternating layers of sealant compositions displaced into an annulus between a wall of the wellbore and a conduit in the wellbore, wherein a mechanical property of one of the sealant composition and the same mechanical property of another sealant composition have substantially different values, wherein sealant compositions are capable of resisting failure when at least one of them is subjected to a mechanical stress.

29. The structure of claim 28, wherein the mechanical stress is caused by an expansion or contraction of the conduit.

30. A structure for sealing a wellbore, comprising alternating layers of sealant compositions displaced into an annulus between a wall of the wellbore and a conduit in the wellbore, wherein a mechanical property of one of the sealant composition and the same mechanical property of another sealant composition have substantially different values and wherein one of the sealant compositions comprises a foamed cement composition and another of the sealant compositions comprises a non-foamed cement composition.

31. A structure for sealing a wellbore, comprising alternating layers of sealant compositions displaced into an annulus between a wall of the wellbore and a conduit in the wellbore, wherein a mechanical property of one of the sealant composition and the same mechanical property of another sealant composition have substantially different values and wherein one of the sealant compositions comprises cement and an additive selected from the group consisting of hollow beads, cenospheres, glass beads, thermoplastic beads, elastomeric beads, elastomers, styrene-butadiene copolymers, aqueous solutions of silicate salts, minerals, pozzalanic ash materials, slag, expansion additives, clays, fibers, or combinations thereof.

32. A structure for sealing a wellbore, comprising alternating layers of sealant compositions displaced into an annulus between a wall of the wellbore and a conduit in the wellbore, wherein a mechanical property of one of the sealant composition and the same mechanical property of another sealant composition have substantially different values and wherein one of the sealant compositions comprises a cement composition and another of the sealant compositions comprises a flexible sealant composition.

33. The structure of claim 32, wherein the cement composition is foamed, non-foamed, or both.

34. A structure for sealing a wellbore, comprising alternating layers of sealant compositions displaced into an annulus between a wall of the wellbore and a conduit in the wellbore, wherein a mechanical property of one of the sealant composition and the same mechanical property of another sealant composition have substantially different values and wherein the flexible sealant composition comprises latex, liquid rubber, silicone oil, or combinations thereof.

35. The structure of claim 34, wherein the latex-based sealant composition comprises a colloidally stabilized latex.

* * * * *